United States Patent [19]

Eppe et al.

[11] 3,977,781

[45] Aug. 31, 1976

[54] EXPOSURE SYSTEM FOR ELECTROPHOTOGRAPHIC COPYING APPARATUS

[75] Inventors: Rudolf Eppe, Taufkirchen; Gunther Schnall, Eching; Gunter Abbe, Gilching; Rudiger Ettelbruck, Munich, all of Germany

[73] Assignee: AGFA-Gevaert, A.G., Leverkusen, Germany

[22] Filed: May 31, 1974

[21] Appl. No.: 475,150

[30] Foreign Application Priority Data

June 5, 1973 Germany.............................. 2328463

[52] U.S. Cl....................................... 355/18; 355/69

[51] Int. Cl.²........................................ G03B 27/32

[58] Field of Search............... 355/8, 18, 54, 55, 58, 355/60, 64, 65, 67, 69, 70

[56] References Cited

UNITED STATES PATENTS

| | | | |
|---|---|---|---|
| 3,612,679 | 10/1971 | Punnett | 355/8 |
| 3,614,222 | 10/1971 | Post | 355/8 |
| 3,687,545 | 8/1972 | Moorhusen | 355/65 |
| 3,724,944 | 4/1973 | Sugita et al. | 355/67 X |
| 3,754,822 | 8/1973 | Melrose | 355/8 |
| 3,788,740 | 1/1974 | Shogren | 355/8 X |
| 3,815,991 | 6/1974 | Janssen | 355/65 |

*Primary Examiner*—Joseph F. Peters, Jr.
*Assistant Examiner*—Alan Mathews
*Attorney, Agent, or Firm*—Michael J. Striker

[57] ABSTRACT

An electrophotographic copying apparatus wherein the original is placed face down onto a stationary transparent holder which is located above a reciprocating carriage for a lens element. The latter images the original onto a light receiving surface which travels along a straight path while the carriage moves in the same direction as the light receiving surface. The carriage can be moved by an eccentric drive, by a wiper which is attached to an endless belt or chain, or by a cam and follower assembly. The original is illuminated by flash lamps which are fired automatically while the carriage moves in the same direction as the light receiving surface.

13 Claims, 3 Drawing Figures

EXPOSURE SYSTEM FOR ELECTROPHOTOGRAPHIC COPYING APPARATUS

BACKGROUND OF THE INVENTION

The present invention relates to electrophotographic copying apparatus in general, and more particularly to improvements in electrophotographic apparatus of the type wherein the image of a stationary original is transferred onto a moving light receiving surface. Still more particularly, the invention relates to improvements in devices which are installed at the exposure station of an electrophotographic copying apparatus and serve to image stationary originals onto a flat light receiving surface.

It is already known to install at the exposure station of an electrophotographic copying apparatus a lens element which moves relative to a stationary original and images successive strip-shaped portions of the original onto a moving light receiving surface. A drawback of such apparatus is that the transfer of images cannot be effected at a relatively high speed, mainly due to the fact that the lens element images successive strip-shaped portions of the original.

It is further known to employ at the exposure station one or more flash lamps and a fixedly mounted lens element which images the original onto a moving light receiving surface. The speed of image transfer is limited by the interval of illumination of the flash lamp or lamps; if the speed is excessive, the transferred image is blurred and cannot be used for the making of sharp copies.

SUMMARY OF THE INVENTION

An object of the invention is to provide an electrophotographic copying apparatus with novel and improved means for exposing images of originals onto a moving light receiving surface at a speed which is higher than the speed of exposure in heretofore known apparatus but does not adversely affect the quality of copies.

Another object of the invention is to provide an electrophotographic apparatus with a novel and improved exposure system which can image stationary originals onto a moving light receiving surface with a desired degree of magnification or reduction and which insures that the exposure of images onto the light receiving surface is effected within a fraction of the time which is required for exposure in heretofore known apparatus.

A further object of the invention is to provide novel and improved means for moving the lens element at the exposure station of an electrophotographic copying apparatus.

An additional object of the invention is to provide novel and improved means for synchronizing the illumination of a stationary original with movement of the lens element relative to the original.

Still another object of the invention is to provide a simple and compact exposure system for use in electrophotographic apparatus of the type wherein the light-receiving surface moves along a straight path during imaging of one side of a stationary original.

An ancillary object of the invention is to provide an exposure system which occupies little room, which comprises a relatively small number of simple parts, and which can be used as a superior substitute for heretofore known exposure systems of electrophotographic copying apparatus.

The invention is embodied in an apparatus for transferring images of stationary originals which comprises a light receiving surface (such surface can be provided at the outer side of an endless flexible belt or the like), means for moving the light receiving surface in a predetermined direction along a first straight path, a stationary holder which is spaced apart from the first path and is arranged to support an original in such position that one side of the original on the holder faces the first path and that the original on the holder is preferably parallel to the light receiving surface in the first path, one or more flash lamps or analogous means for illuminating the one side of an original on the holder, a lens element disposed between the holder and the first path, and means for moving the lens element in the predetermined direction and along a second straight path which is parallel to the first path so that the lens element images the one side of an original on the holder onto the surface in the first path.

The apparatus preferably further comprises means for actuating the illuminating means while the lens element moves in the predetermined direction along the second path, and the means for moving the lens element preferably comprises a mechanism for moving the lens element at a speed which is proportional to the speed of the light receiving surface and to the distance between the first and second paths, i.e., to the magnification or reduction ratio of the exposure system.

The novel features which are considered as characteristic of the invention are set forth in particular in the appended claims. The improved exposure system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
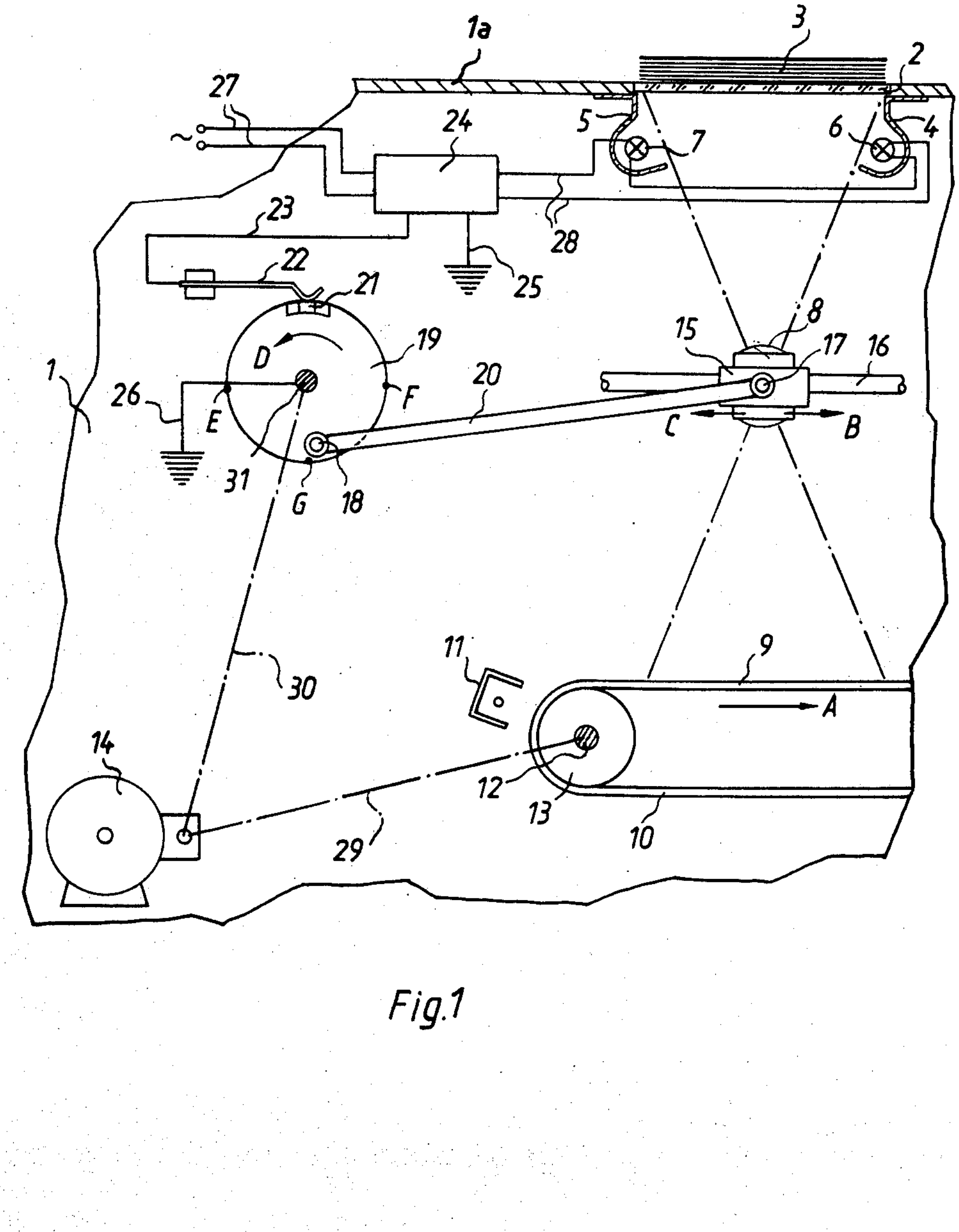
FIG. 1 is a partly schematic fragmentary vertical sectional view of an electrophotographic copying apparatus including an exposure system which embodies one form of the invention.

FIG. 1 shows the exposure station of an electrophotographic copying apparatus which comprises a frame or housing 1 having a horizontal top wall 1*a* with an opening for a transparent plate-like holder 2 for sheet-like originals 3. The underside of the lowermost original 3 of the stack of originals on the holder 2 faces a lens element 8 which is mounted in a carriage 15 movable along a straight horizontal path defined by elongated ways including two or more parallel tie rods 16 mounted in the housing 1 below the holder 2. The underside of the lowermost original 3 on the holder 2 can be illuminated by an illuminating device including two stationary flash lamps 6, 7 respectively mounted in front of reflectors 4 and 5. The flash lamps 6, 7 are designed to furnish flashes of high intensity.

The light-receiving surface 9 is the outer surface of an endless flexible band 10 which is trained over two rollers 13 (only one shown) so that its upper stretch travels along a straight horizontal path which is parallel to the path of the carriage 15 for the lens element 8. The band 10 is a conventional electrophotographic element whose surface 9 receives the image of an original 3 on the holder 2 while the lamps 6, 7 illuminate the underside of such original. The band 10 is electrostatically charged by a corona discharge device 11 which is located at the upstream end of the horizontal path for the upper stretch of the band. The image which is transferred onto the surface 9 by lens element 8 is thereupon transported through a developing station and the thus obtained powder image is transferred onto a copy sheet which is caused to pass through a suitable fixing station in a manner well known from the art of electrophotographic copying apparatus.

The arrow A indicates the direction of lengthwise movement of the surface 9 with the upper stretch of the belt 10, and the arrows B, C indicate the direction of reciprocatory movement of the carriage 15 along the tie rods 16.

The means for moving the surface 9 in the direction of arrow A comprises a shaft 12 which drives the roller 13 and is journalled in the housing 1. The shaft 12 receives motion from an electric motor 14 through the medium of a belt or chain transmission 29. The motor 14 preferably constitutes the main prime mover of the copying apparatus.

The means for moving the carriage 15 and lens element 8 along the tie rods 16 includes an eccentric drive having a rotary disk-shaped member 19 provided with an eccentrically mounted coupling pin 18 for one end of an elongated connecting rod 20. The other end of the connecting rod 20 is articulately connected to the carriage 15 by a second coupling pin 17. The shaft 31 for the rotary member 19 is journalled in the housing 1 and receives torque from the output element of the motor 14 through the medium of a second chain or belt transmission 30.

The means for actuating the illuminating means 6, 7 for an original 3 on the holder 2 comprises a switching device 24 which is connected with a source of electrical energy by power leads 27. A conductor 23 of the switching device 24 is connected with an elastic contact 22 which bears against the periphery of the rotary member 19. The latter carries a second contact 21 which is connected to the ground (as at 26) through the parts 19 and 31. During a certain stage of each revolution of the member 19, the contact 21 slides along the contact 22 whereby the device 24 connects the lamps 6, 7 with the energy source (leads 27). The device 24 includes a grounded conductor 25 which is connected to the conductor 23. Two further conductors 28 connect the device 24 with the lamps 6 and 7.

The operation is as follows:

In FIG. 1, the coupling pin 18 is located at G, i.e., substantially midway between the two dead-center positions E and F where the connecting rod 20 reverses the direction of movement of the carriage 15. The motor 14 drives the rotary member 19 in the direction indicated by arrow D and, therefore, the carriage 15 moves in the direction indicated by arrow B, i.e., in the direction (arrow A) of movement of the surface 9 on the upper stretch of the belt 10. The speed of the carriage 15 and lens element 8 is substantially constant because the position of the coupling pin 18 is close to or coincides with the locus G. The direction of movement of the carriage 15 changes from B to C when the coupling pin 18 reaches the position F. A copying operation begins when the coupling pin 18 reaches the position E, i.e., when the carriage 15 begins to move in the same direction (arrow B) as the surface 9 on the upper stretch of the belt 10.

The device 24 fires the flash lamps 6, 7 when or shortly before the coupling pin 18 reaches the locus G, i.e., when the speed of the carriage 15 and lens element 8 in the direction indicated by arrow B is substantially constant. The exposure is completed not later than when the coupling pin 18 reaches the position F, and the rotary member 19 thereupon continues to rotate anticlockwise (arrow D) to return the coupling pin 18 to the starting position at E. The carriage 15 moves in a direction to the left (arrow C) while the coupling pin 18 travels from the position F toward the position E.

A fresh original 3 can be imaged onto the surface 9 during the next-following movement of the coupling pin 18 from the position E toward the position F (or the same original can be imaged for a second time).

The ratios of the transmissions 29, 30 are selected in such a way that the speed of movement of the carriage 15 and lens element 8, when the coupling pin 18 reaches the locus G, is exactly half the speed of lengthwise movement of the upper stretch of the belt 10 (arrow A). This reduces or eliminates the likelihood of blurring the image of the original 3 on the surface 9. As stated before, the flash lamps 6, 7 are fired when the moving contact 21 reaches the stationary contact 22, i.e., when the coupling pin 18 is at or close to the locus G. Thus, the illumination of an original 3 on the holder 2 is synchronized with movement of the lens element 8 in the direction of movement of the surface 9.

Figure 2:
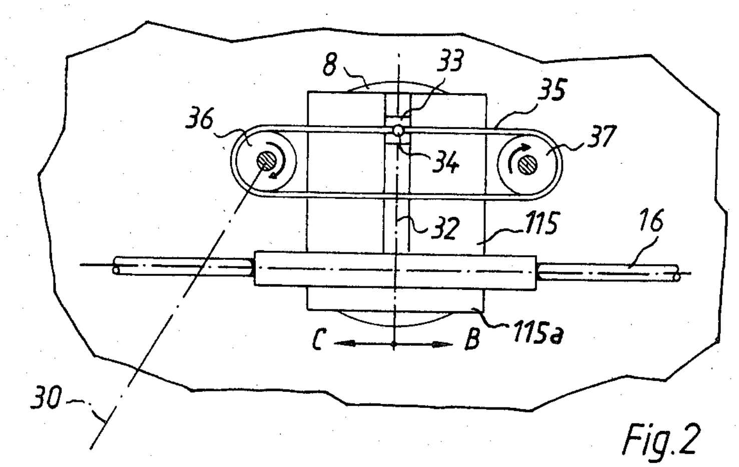
FIG. 2 illustrates a first modification of the means for moving the lens element of the exposure system.

FIG. 2 shows modified means for moving the carriage 115 for the lens element 8 in directions indicated by arrows B and C. The carriage 115 has sleeves 115*a* which are slidable along horizontal tie rods 16 and has a vertical recess or groove 32 for a wiper 33 which is coupled to an endless belt or chain 35 by a pin 34. The belt or chain 35 is trained over two rollers or sprocket wheels 36, 37 the former of which is driven by the belt or chain transmission 30. When the wiper 33 advances with the upper stretch of the belt or chain 35, the carriage 115 travels at a constant speed in the direction indicated by arrow B, i.e., in the direction of lengthwise movement of the surface 9 (not shown in FIG. 2) on the upper stretch of the belt 10. The carriage 115 and lens element 8 move back toward their starting positions during travel of the wiper 33 with the lower stretch of the belt or chain 35. When the wiper 33 travels about the roller or sprocket wheel 36 or 37, the carriage 115 undergoes a sinusoidal acceleration or deceleration.

The moving means of FIG. 2 is capable of insuring a more accurate synchronization of movement of the lens element 8 with the movement of surface 9 during exposure of an original because the carriage 115 travels at a constant speed while the wiper 33 travels with the upper or lower stretch of the belt or chain 35.

Figure 3:
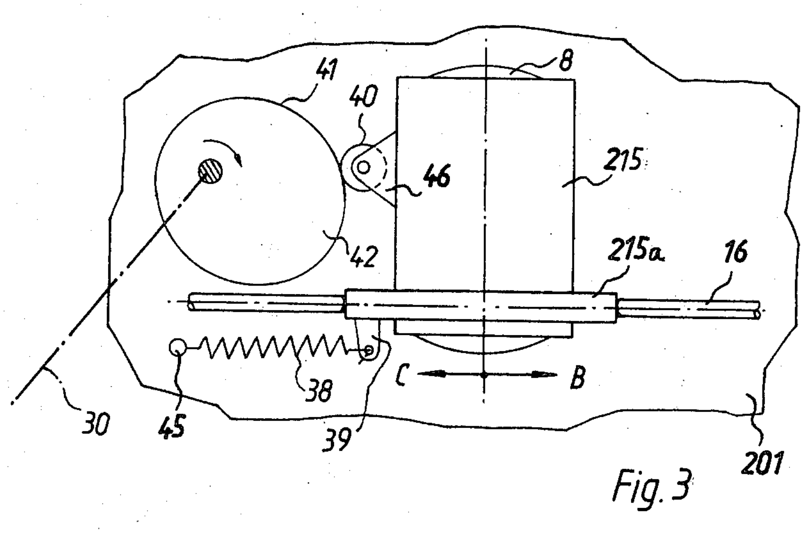
FIG. 3 shows a second modification of the means for moving the lens element.

FIG. 3 illustrates a third means for moving the carriage 215 for the lens element 8 in directions indicated by arrows B and C. At least one sleeve 215*a* of the carriage 215 is provided with a lug 39 connected to one end of a helical spring 38 the other end of which is secured to a post 45 fixed to the housing 201. The carriage 215 further includes a bearing bracket 46 for a roller follower 40 which bears against the periphery 41 of a rotary cam 42 under the action of the spring 38. The cam 42 is driven by the belt or chain transmission 30. The curvature of the periphery 41 of the cam 42 is such that the carriage 215 moves with lens element 8 at a substantially constant speed (arrow B) during imaging of an original onto the surface 9 (not shown in FIG. 3) and that such movement is followed by a desirable gradual deceleration and gradual acceleration prior to full-speed movement of carriage 215 in the direction indicated by arrow C.

The moving means of FIG. 3 is simpler than the corresponding moving means of FIGS. 1 or 2 but is still capable of moving the lens element 8 at an optimum speed during imaging of originals, i.e., while the carriage 215 moves in the direction indicated by arrow B.

By furnishing the exposure system with a number of different cams 42, one can impart to the lens element 8 any desired movement during exposure of an original.

An important advantage of the improved exposure system is that one can obtain a clear image of the original irrespective of the speed of the surface 9. Moreover, the distances covered by the lens element 8 (arrow B or C) are short which is in contrast to the operation of conventional exposure systems for illumination of successive strip-shaped portions of an original. The feature that the lens element covers short distances contributes to compactness of the exposure system as well as to compactness of the entire copying apparatus. The means for moving the lens element is simple, rugged and can move the lens element with a high degree of reproducibility.

Another advantage of the improved exposure system is that it can employ illuminating means which produces long-lasting flashes and that such flashes can be produced by resorting to relatively low voltages. This reduces the energy requirements and the expenditures for precautionary measures which must be undertaken for operation with high voltages.

Without further analysis, the foregoing will so fully reveal the gist of the present invention that others can, by applying current knowledge, readily adapt it for various applications without omitting features which fairly constitute essential characteristics of the generic and specific aspects of our contribution of the art and, therefore, such adaptations should and are intended to be comprehended within the meaning and range of equivalence of the claims.

What is claimed as new and desired to be protected by Letters Patent is set forth in the appended claims:

1. Apparatus for transferring images of stationary originals onto a light receiving surface, comprising, in combination, means for moving said surface in a predetermined direction along a first path; a stationary holder for said originals, said holder being spaced apart from said path and being arranged to support an original in a position in which one side of said original on said holder faces said path; flash means for illuminating said one side of said original for a predetermined short illuminating interval; a lens element disposed between said holder and said path; and means for moving said lens element in said predetermined direction along a second path parallel to said first path during said short illuminating interval, so thatsaid lens element images all of said one side of that said original onto said light receiving surface.

2. Apparatus as set forth in claim 1, wherein said means for moving said lens element comprise means for moving said lens element along a third path including said second path but exceeding said second path in length; further comprising means for activating said flash means in dependence on the movement of said lens element so that said flash means furnishes said flash while said lens element moves along said second path.

3. Apparatus as defined in claim 2, wherein said actuating means comprises a rotary member, first electric contact means provided on said rotary member, second electric contact means adjacent to said rotary member and arranged to engage said first contact means in a predetermined angular position of said rotary member, and means for connecting said flash means with an energy source during engagement between said first and second contact means.

4. Apparatus as set forth in claim 1, wherein said means for moving said lens element comprises a mechanism for moving said lens element at a speed dependent upon the speed of said surface and the distance between said path.

5. Apparatus as set forth in claim 1, wherein said means for moving said lens element comprises a carriage for said lens element, elongated ways supporting said carriage for movement along said second path, an endless flexible element having a stretch parallel to said ways, means for moving said flexible element, and means for coupling said carriage to said flexible element for movement therewith.

6. A combination as defined in claim 1, wherein said means for moving said lens element comprises a carriage for said lens element, elongated ways supporting said carriage for movement along said second path, and an eccentric drive for moving said carriage along said ways.

7. A combination as defined in claim 6, wherein said drive comprises a rotary member having an eccentrically mounted coupling member and a connecting rod secured to said coupling member and articulately connected to said carriage.

8. Apparatus as defined in claim 5, wherein said carriage comprises a recess extending at right angles to said second path and said coupling means comprises a wiper secured to said flexible element for movement therewith and slidably extending into said recess.

9. A combination as defined in claim 1, wherein said means for moving said lens element comprises a rotary cam and follower means operatively connected with said lens element and tracking said cam.

10. A combination as defined in claim 9, wherein said means for moving said lens element further comprises a carriage for said lens element, elongated ways supporting said carriage for movement along said second path, and means for biasing said follower means against said cam, said follower means being mounted on said carriage.

11. A combination as defined in claim 1, wherein said holder is parallel to said paths.

12. A combination as defined in claim 1, wherein said illuminating means comprises at least one flash lamp.

13. A combination as defined in claim 1, wherein said surface forms part of an endless flexible element having an elongated stretch located in said first path.

* * * * *